United States Patent [19]

Wang

[11] 3,778,732

[45] Dec. 11, 1973

[54] BASE BAND PULSE ENERGY STORAGE SYSTEM

[75] Inventor: Chao Chen Wang, West Concord, Mass.

[73] Assignee: Sperry Rand Corporation, New York, N.Y.

[22] Filed: Nov. 20, 1972

[21] Appl. No.: 308,081

[52] U.S. Cl. .................... 333/20, 307/264, 328/65, 328/151, 333/10, 333/24 R, 333/82 B

[51] Int. Cl. .............................. H03k 5/01

[58] Field of Search ..................... 307/246, 264; 328/41, 49, 50, 53, 59, 65, 151; 333/20, 24 R

[56] References Cited

UNITED STATES PATENTS

| | | | |
|---|---|---|---|
| 2,930,004 | 3/1960 | Coale | 333/24 R |
| 3,333,203 | 7/1967 | Baker | 307/264 X |

*Primary Examiner*—Paul L. Gensler
*Attorney*—Howard P. Terry

[57] ABSTRACT

A short duration pulse circulating storage system utilizes a non-dispersive TEM-mode transmission line arrangement for amplifying pulsed electromagnetic fields by synchronous addition of the energy from low-level base band input pulses, producing high-amplitude undistorted base band output pulses.

14 Claims, 32 Drawing Figures

PATENTED DEC 11 1973 3,778,732

SHEET 4 OF 5

BASE BAND PULSE ENERGY STORAGE SYSTEM

BACKGROUND OF THE INVENTION

1. Field of the Invention

The invention relates to transmission line electromagnetic energy storage and processing systems for amplifying low level signals and more particularly concerns such devices for the storage and synchronous amplification of the energy in regular low-level base band pulse trains for the generation of high-amplitude undistorted output pulses.

2. Description of the Prior Art

For operation as short or base band pulse sources in the time domain measurement of the characteristics of microwave circuits and for use in very short range distance measurement systems, for example, there has arisen an increasing need for means of producing well-defined electromagnetic pulses of nanosecond or subnanosecond duration. Pulse generation circuits utilizing mercury wetted relays or step recovery or other recently developed high frequency diodes have produced such trains of base band pulses, but are efficient only at relatively low output power levels. Each device has a practical maximum power limit for producing such very sharp pulses, since the pulses contain a wide spectral array of harmonic frequencies. The prior art circuits successfully produce low amplitude base band pulses at relatively high repetition rates, but are not capable of generating relatively high amplitude pulses.

There is available in the prior art narrow band means for storing relatively low-level single-frequency continuous wave energy, and for accumulating the energy for an arbitrary period of time before its release as a radio frequency pulse many carrier frequency cycles in duration. Such an arrangement is taught in the F.S. Coale U.S. Pat. No. 2,930,004 for a "Microwave Pulser", issued Mar. 22, 1960 and assigned to the Sperry Rand Corporation. However, the Coale device is not suited for processing base band pulses because of many defects which become apparent when it is considered for such usage.

A primary defect of the Coale device which prevents its use for processing base band pulses lies in the fact that frequency dispersive rectangular transmission line elements are employed. Such transmission lines demonstrate different velocities for each of the many harmonic frequency components of base band pulses. In a very short time of propagation of a base band pulse in such a transmission line, its energy becomes scattered over a broad space in the direction of propagation in the guide and it cannot therefore be successfully combined with that of a later introduced base band pulse. Further, the Coale device employs a continuous wave guiding track and transmission line elements whose bends and other discontinuities behave in a very dispersive manner, further distorting the sharp input base band pulses.

An important defect of the Coale device for use in processing base band pulses lies in the nature of the environment in which the output switch must operate. Since the switch must change state in the presence of full power in Coale's wave guiding track, part of the radio frequency energy is lost during each switching event. The switch itself is therefore expensive to construct and to maintain, since it must withstand the full radio frequency voltage at all times. Such high power switches are generally inefficient and slow so that a large fraction of the radio frequency power is lost. Accordingly, the prior art Coale device has not been adapted for use with base band pulses.

SUMMARY OF THE INVENTION

The invention is a transmission line storage and amplification means for converting relatively low-level base band pulses at a first repetition frequency into amplified base band pulses at a lesser repetition rate. The apparatus utilizes a non-dispersive TEM-mode transmission line system excited by a base band pulse train for amplifying pulsed traveling electric fields within the storage device by synchronous addition of the energy of the individual pulses of the input pulse train. High-power base band output pulses are selectively gated out of storage by a switch which closes and opens in the complete absence at the switch of output power. Since a dispersionless TEM-mode transmisssion line system is employed, and since an inexpensive switch may be used that does not have to withstand high electric fields at all times, the problems of the prior art are overcome.

DESCRIPTION OF THE PREFERRED EMBODIMENT

Figure 1:
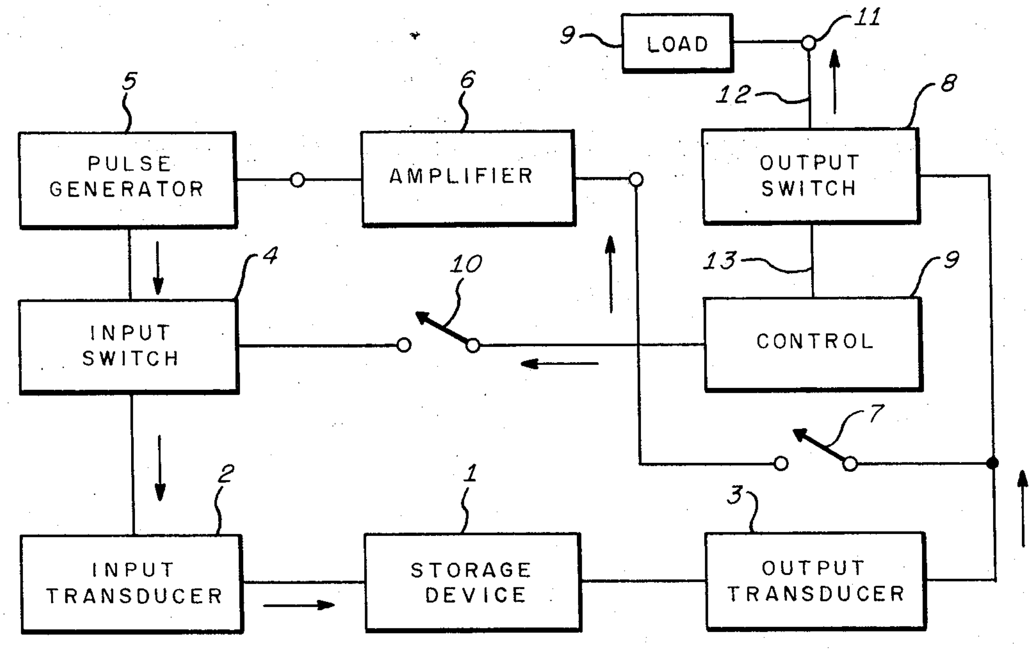
FIG. 1 is a block diagram of a preferred form of the invention.

In many data manipulation disciplines, signals, including electromagnetic signals, are used which have a periodic but non-sinusoidal nature. Such signals are polarized pulses and may have an arbitrary repetition rate, each having very short time durations, such as sub-nanosecond durations. Impulses of this type are known in the art as base-band pulses and each has an extremely wide energy spectrum so that the energy content of each individual pulse is spread over very many spectral lines.

The present invention supplies a need in the base-band or time domain art for a device capable of storing the energy of individual base band pulses so that successive pulses of successive cycles of such a pulse train circulate in a storage apparatus with space separations related to the pulse repetition period. The objective is to employ the periodic character of the wave train to add together constructively the energy contributions of the individual base band pulses of the train for forming a greatly amplified but undistorted base band output pulse. In such an arrangement, if it were not for losses in the storage device itself, the amplitude of a stored pulse would grow indefinitely. In a practical case, loss is present, and the amplitude build-up rate must reach a plateau.

After the input pulse train is switched off, the generated high amplitude pulse will continue to circulate indefinitely in the storage device if there are no losses present; in the practical case, such losses are present and the recirculating pulse decays exponentially. In the presence of loss, small amounts of amplitude-maintaining energy may be inserted into the storage device to off-set the losses, and the stored pulse can be made to circulate indefinitely.

Input and output transducers and the storage device used in the invention are preferably of the non-dispersive TEM-mode propagation kind, as will be seen. It will be understood by those skilled in the art that the term non-dispersive TEM-mode of wave propagation is that commonly used in the high frequency literature to specify a conventional mode of electromagnetic energy propagation. In the TEM or transverse electromagnetic mode, both the electric and magnetic field components of the wave are everywhere transverse to the direction of wave propagation. This is in contrast to the characteristics of certain other often used types of electromagnetic waves, such as the transverse electric (TE) and transverse magnetic (TM) mode waves. The TE and TM modes are dispersive modes, while the TEM mode employed in the present invention is desirably non-dispersive, the velocity of propagation of the TEM-mode wave being a constant rather than varying with frequency.

Only if the transmission line transducer used to introduce a pulse into the storage apparatus is also non-dispersive, the wave shape of the stored pulse will be an exact duplicate of the shape of the input pulse. This result requires that the impulse response of the storage system be a train of delta functions of uniform amplitude, a requirement not fully met in practice, so that the shape of the stored pulse in the practical case may differ somewhat from that of the input pulse. Accordingly, the characteristics of the input transducer may be altered in such a manner as to correct the shape of the stored circulating pulse. For example, a linear phase shift will produce a desired delay without causing the pulse amplitude shape to change. It may be desirable to use only small phase shift or certainly phase shifts that vary linearly with frequency in order not to distort pulse timing and to prevent the desired base-band pulse duration from being unduly extended.

The basic combination of elements used in the invention is seen in FIG. 1, where the storage device 1 has associated with it in energy coupling relation a non-dispersive input transducer 2 and a non-dispersive output transducer 3. Transducers 2 and 3 control the character of the coupling with respect to the storage device 1 of the input and output pulses, and hence the relative energy inflow and outflow, output pulse magnitude, and output pulse wave shape. Pulse generator 5 may be a frequency stable or automatic repetition frequency controlled pulse circuit of conventional type. For example, if very short duration or base-band pulses are to be generated, sub-nanosecond pulsers may be used in element 5 such as are illustrated in the G.F. Ross U.S. Pat. No. 3,402,370 for a "Pulse Generator", issued Sept. 17, 1968, in the G.F. Ross et al U.S. Pat. No. 3,659,203 for a "Balanced Radiator System", issued Apr. 25, 1972 and assigned to the Sperry Rand Corporation, and elsewhere. The pulser 5 may incorporate short pulse generators which have demonstrated successful long-life use of p-n junction charge storage or step recovery diodes readily available on the market in conventional circuits which yield sharp pulses with relatively high duty rates.

It will be understood that the pulse generator 5 may be part of an external apparatus cooperating with the invention, such as a pulse source found in a digital computer or other processing system. The timing of pulse generator 5 may alternatively be under control of a feed back amplifier 6 when switch 7 is closed, the low-noise, wide-band amplifier 6 then lying in a feed back path between output transducer 3 and pulse generator 5. The feed back amplifier 6 is not used in most cases, but can be employed as a conventional substitute for frequency stabilization of the repetition rate of pulse generator 5, if required.

Pulse input switch 4 is coupled between generator 5 and input transducer 2 for determining the number of pulses that are admitted to storage device 1; where the apparatus is used continuously, switch 4 may be omitted or its control by control device 9 eliminated by opening switch 10. Output transducer 3 supplies a useful output on terminal 11 via switch 8 in a manner which may also be determined by control 9 in a predetermined time sequence. It will be understood that the outputs 12 and 13 of switch 8 may be the same. The storage device 1 and its associated transducer 2 and 3 are the central elements of the novel system for time-domain storing of short time duration pulses.

It is well known that an electromagnetic cavity resonator may be used to store energy coupled into it in the form of a single-frequency continuous sinusoidal wave. However, such conventional cavity resonators do not prove useful in the present invention, since they are not arranged to employ resonances that occur at harmonically related frequencies. In the present invention, wherein periodic short duration or base-band impulses are to be stored, it is necessary that the storage medium have resonances at substantially all of the many harmonic frequencies present in the base-band pulses to be stored. The transducers 2 and 3 must couple in a particular and efficient manner to the fields within storage device 1 corresponding to each of the frequency harmonics; i.e. the peak field for each harmonic must be found in substantially the same location for each harmonic mode so that a single transducer suffices to couple to the many harmonic fields. For the same reason, the fields of the various harmonic modes must have the same polarization.

Figure 3:
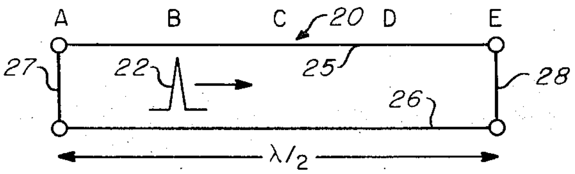
FIGS. 3 and 4 are schematic representations of storage transmission lines for use in the apparatus of FIG. 1.
Figure 4:
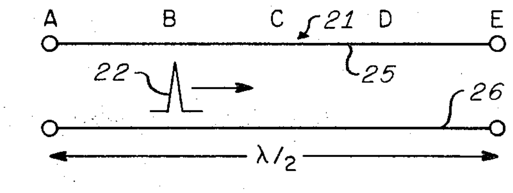

As will be seen, a class of transmission line storage devices that satisfies the foregoing conditions includes devices made by properly terminated substantially dispersionless TEM-mode transmission lines in which the electromagnetic field has zero curvature and the propagation velocity along the transmission line is a constant equal to the velocity of light *c*. Representative of such transmission line storage devices are the two-wire arrangements 20 and 21 of FIGS. 3 and 4. Each is a half wave in length and is represented as having a short time duration pulse 22 propagating in it. For the fundamental pulse repetition period T, wave length λ is *c*/T. FIG. 3 represents a transmission line storage device 20 composed of parallel conductors 25, 26 spanned at its respective ends by shorting conductors 27 and 28. FIG. 4 represents an open-circuited transmission line storage device 21 with a pair of parallel conductors 25, 26. Storage devices 20 and 21 have resonances at all of the harmonics present in pulse 22. In the shorted line 20, the resonances may be at exact harmonics, as perfect shorts are readily made, as at 27 and 28. For the open circuited storage device 21 of FIG. 4, however, there are small perturbing capacitances at the transmission line ends; if the fundamental or one harmonic is truly resonant, other frequency modes are successively displaced in frequency by small amounts relative to their true harmonic values.

Figure 2:
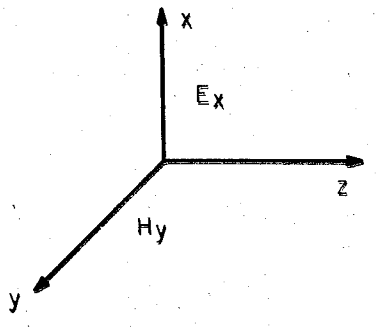
FIG. 2 is a representation of a coordinate system.
Figure 5:
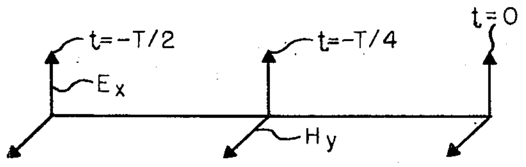
FIGS. 5 through 10 are graphs useful in explaining operation of the transmission line systems of FIGS. 3 and 4.
Figure 7:
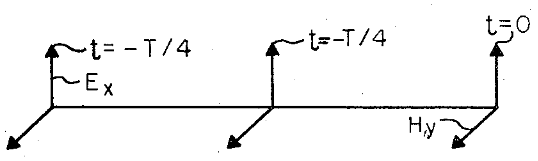
Figure 6:
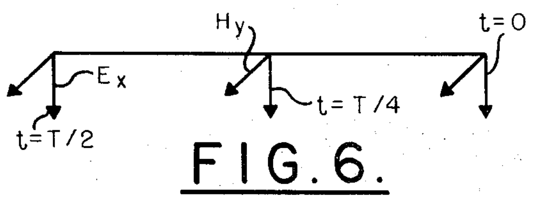
Figure 8:
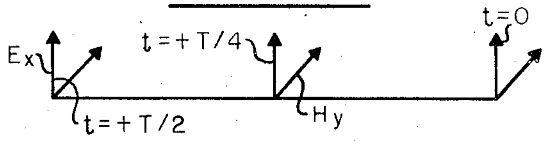

For the storage of a sharp pulse, the preservation of the relative phases and amplitudes of the various frequency components of the pulse is required and important time domain factors are to be considered. The very short pulse 22 will circulate in either transmission line storage 20 or 21 by traveling in one direction during a given time period and then reversing its direction of travel at an inverting end of the transmission line where perfect reflection takes place. In the TEM-mode, the pulse 22 flowing in line 20 in the direction can be represented by the mutually orthogonal field vectors $E_x$ and $H_y$ directed in the coordinate system seen in FIG. 2. In the shorted storage device 20 of FIG. 3, the instantaneous fields seen at locations A, C, and D are represented in FIG. 5 as pulse 22 progresses toward short 28. Upon reflection at short 28, it is seen from FIG. 6 that the magnetic field $H_y$ remains oriented in the same direction when the propagation direction reverses, while the electric field $E_x$ is reversed. On the other hand, FIGS. 7 and 8 show that the opposite is true for the open circuited device 21 of FIG. 4; i.e., the electric field vectors $E_x$ are in the same orientation for both directions of propagation, while the magnetic field vectors $H_y$ reverse in direction.

Figure 9:
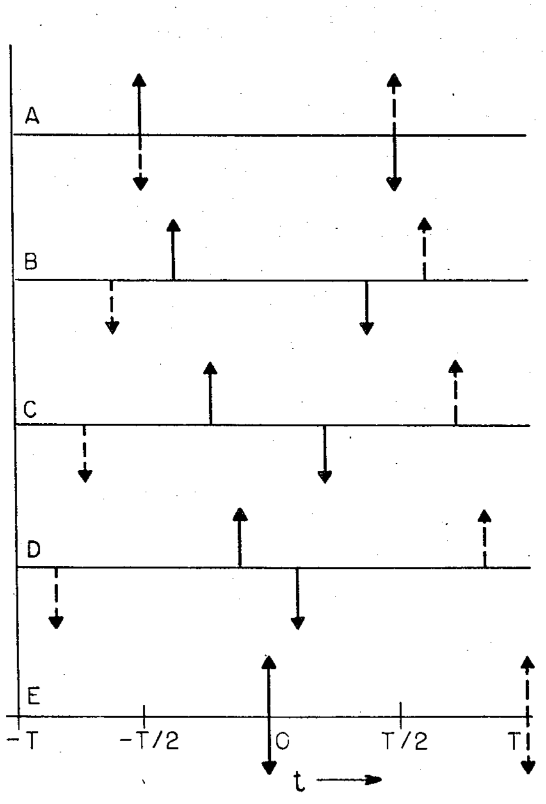
Figure 10:
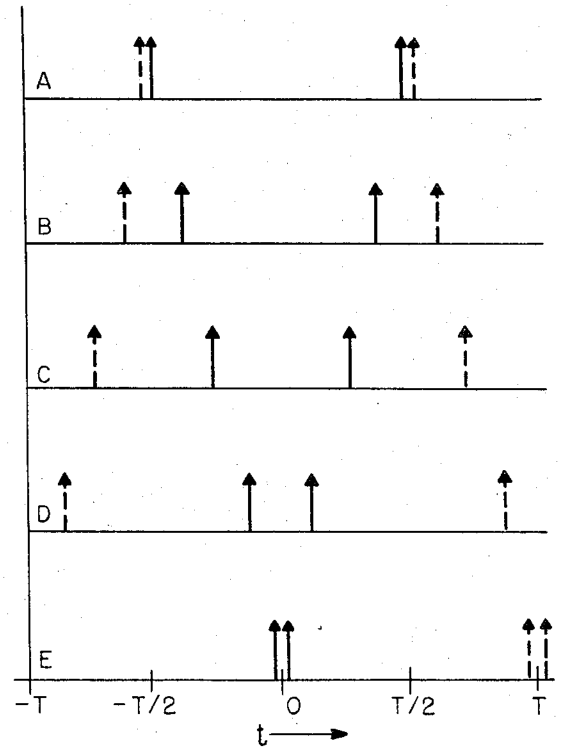

The oppositely traveling fields $E_x$ and $E_y$ are represented in FIGS. 9 and 10 as they appear in time sequence at the several locations A, B, C, D, and E of storage devices 20 and 21. The $E_x$ field for the shorted storage 20 and the $H_y$ field for the open circuited storage line 21 are seen to be time symmetric about $t = 0$. On the other hand, the $E_x$ field for the open circuited storage line 21 and the $H_y$ field for the shorted storage line 20 are anti-symmetric about $t = 0$.

Most input coupling devices are bidirectional; the only locations for such a coupler of single pulses per period T are at either end of the storage transmission line. For the shorted storage device 20, magnetic coupling may be used so that a pulsed magnetic field in a given direction is coupled into storage line 20 at either end of the line. For the case of the open transmission line 21, a probe coupling to the electric field may be employed at either end of the transmission line. To feed either transmission line with a bidirectional coupler would undesirably result in pulses returning to the coupler at non-coincident times.

Figure 11:
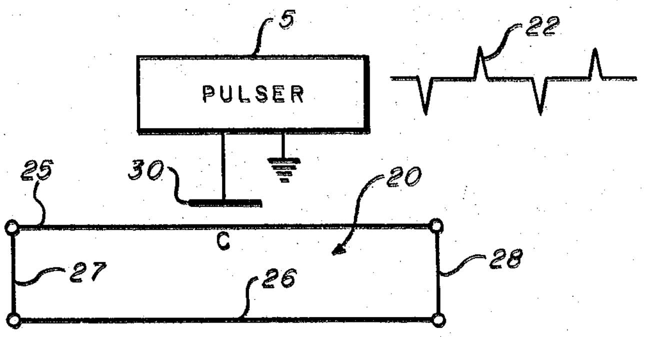
FIGS. 11 and 12 are schematic illustrations of means for coupling base band pulses with respect to the respective transmission line systems of FIGS. 3 and 4.
Figure 12:
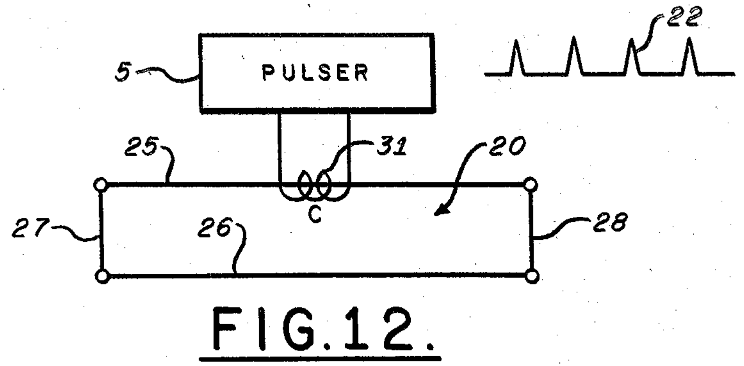

In one form of the invention as seen in FIG. 11, the input may be fed at a point corresponding to C in a shorted line by what is schematically represented as a capacitive probe 30. For proper excitation of oppositely running pulses in transmission line storage 20, the pulser 5 is caused in a conventional manner to generate the alternate positive and negative pulses of the pulse train 22 with the pulses separated by T/2 seconds. Alternatively, as in FIG. 12, a magnetic feed 31 may be used at the mid-point location C, excited by pulser 5 with a pulse train having all pulses of like polarity (all positive or all negative pulses 26 separated by intervals of T/2 seconds). If the lines 25 and 26 are open instead of being provided with shorts 27, 28, the magnetic feed 31 will require pulses of alternating polarity and the electric feed 30 will require pulses of like polarity.

Figure 13:
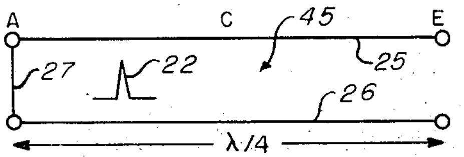
FIG. 13 is an alternative form of the transmission line systems of FIGS. 3 and 4.
Figure 14:
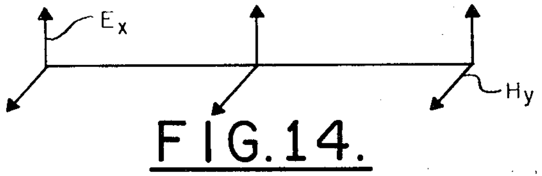
FIGS. 14 through 17 are graphs useful in explaining the operation of the circuit of FIG. 13.
Figure 15:
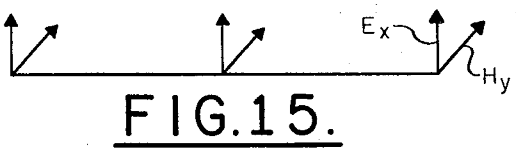
Figure 16:
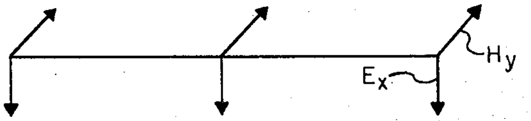
Figure 17:
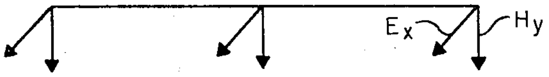

FIG. 13 represents a TEM-mode storage device 45 responding only to odd harmonics; the storage device 45 consists, for example, of the parallel conductors 25 and 26 with a short 27 at one end of the device, the opposite end of its transmission line being open circuited. A pulse 22 traversing the line travels its length four times before a cycle is completed. The $E_x$ and $H_y$ fields go through the successive orientations depicted in FIGS. 14 through 17 during the four transits of pulse 22 at locations A, C, and E along the transmission lines 24, 26. It is seen that the polarity of the $E_x$ field of the pulse reverses at one end of the transmission line 25, 26 and that the magnetic field $H_y$ reverses at the other. The wave pattern is antisymmetric in the time domain and consists of odd harmonics only. The storage device 45 lends itself to storage of a first or positive pulse and then storage of a second or negative pulse coupled into the line T/2 seconds later than the injection of the first pulse. Either magnetic or electric field transducers of the kinds schematically shown in FIGS. 11 or 12 may be employed with the storage device 45 of FIG. 13, for example.

Figure 18:
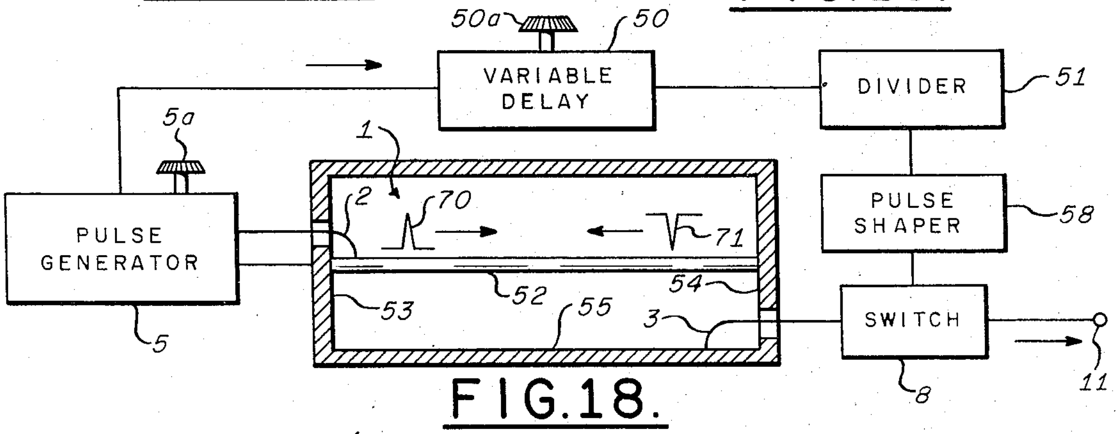
FIG. 18 is a diagram, partly in cross section, of a further preferred form of the apparatus of FIG. 1.

FIG. 18 represents in a general manner one preferred form of the invention. The pulser 5 is adjustable in frequency according to the manually or automatically set control 5a so that the repetition interval T of the generated pulse train matches the requirements of transmission line storage device 1, the pulser 5 being coupled thereto by a transducer represented by magnetic coupling loop 2. The output terminal 11 is coupled by magnetic loop transducer 3 through switch 8. The pulse generator 5 may act as a synchronizer for switch 8 by supplying its output pulse train through variable delay circuit 50, adjustable according to the setting of knob **50*a*, frequency divider 51, and pulse shaper 58 to switch 8**.

Figure 19:
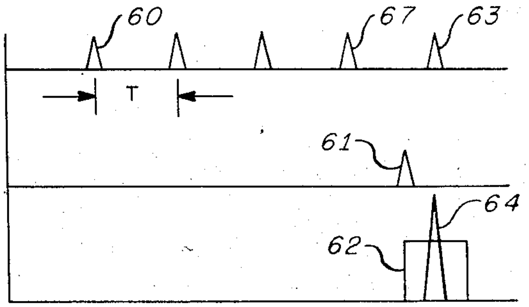
FIG. 19 includes graphs of wave forms useful for explaining the operation of the alternative form of apparatus shown in FIG. 18.

In operation, a series of narrow pulses of period T constituting pulse train 60 of FIG. 19 is coupled to storage device 1 and also to the conventional variable delay 50. The delayed train is counted in a conventional divider-counter 51, which latter emits one output pulse for n input pulses, such as at the time of pulse 61 of FIG. 19. Pulse 61 is used in the conventional pulse shaper 58 to form a gate or switching pulse 62 which straddles the location of the $(n+1)$'th pulse 63 of train 60. The $(n+1)$ pulses of train 60 are converted to a single giant pulse 64 by storage device 1, as previously discussed. Gating pulse 62 is used in switch 8 to permit the giant pulse 64 to pass to output terminal 11. Switch 8 is never exposed to power during its opening or closing events.

In FIG. 18, storage device 1 is multiply tuned to appear to be resonant to all of the harmonic frequencies which constitute each base-band pulse 60, these frequencies falling at integral harmonic multiples of frequency 1/T. With an appropriate network for input feed transducer 2, it requires a time $TQ/2\pi$ to build up the amplitude of the polar or bipolar pulses 70, 71 circulating therein to a constant amplitude, since this amplitude grows exponentially. The steady state peak power grows to substantially $Q/2\pi$ times the peak power of each input pulse, assuming that the impedance of transducer 2 matches that of the transmission line 1.

The transmission line storage device 1 of FIG. 18 is a multiply resonant coaxial transmission line comprising respective coaxial inner and outer conductors 52 and 55, closed at its ends by the respective short circuiting walls 53 and 54. Switch 8 is normally open, disconnecting storage device 1 from output terminal 11, thus permitting the amplitude of a circulating pulse, such as pulse 70, to grow to the giant amplitude of pulse 64. The gating pulse 62 begins and ends after and before the time of respective immediately preceding and following pulses of train 60 so as to encompass only a grown pulse 64 at the time of the $(n+1)$'th pulse in the train, such as at the time of pulse 63. This ensures against opening or closing switch 8 at the point in time that the energy of the giant pulse 64 is actually present at the switch. Thus, switch 8 is never required to withstand the high voltage of giant pulse 64 during the opening or closing event, permitting the use of a simple and inexpensive switch. Also, multiple pulses cannot appear at output terminal 11, since gate pulse 62 is timed never to include them.

The output transducer 3 is adjusted employing conventional techniques to cause complete and instantaneous transfer of the giant stored pulse 64 from storage device 1 to terminal 11. Such may readily be accomplished if the pulse output system is loaded so that its quality factor $Q_{OUT}$ is equal to $2\pi$, a readily achieved adjustment permitting the energy of the giant pulse fully to flow out of storage in one period T. This corresponds to making the load itself match the characteristic impedance of transmission line storage device 1.

Other transmission line storage devices are suitable for use as storage device 1, since several types of high Q transmission line systems are non-dispersive and can be multiply tuned to the set of harmonically related frequencies making up a typical base-band pulse. Coaxial lines, two-wire lines, and strip transmission lines of several types are useful TEM-mode guides for this purpose. Cryogenic cooling may be used to increase the quality factor Q, as well as gold or silver plating of the conducting surfaces of the guides.

To achieve a relatively high quality factor Q for each of the spectral lines of a base-band pulse, coaxial transmission line is of merit when formed into a lineal cavity. The quality factor Q of such a coaxial line TEM-mode transmission line storage device is increased by increasing the inner diameter of the outer conductor; there is, however, an upper limit where the line supports higher order modes which destroy the dispersionless characteristic of TEM-mode propagation. This limit is reached when the wave length of the lowest higher order mode is equal to the average of the circumferences of the inner conductor and of the inner surface of the outer conductor. Larger outer conductor internal diameters are to be avoided.

Figure 21:
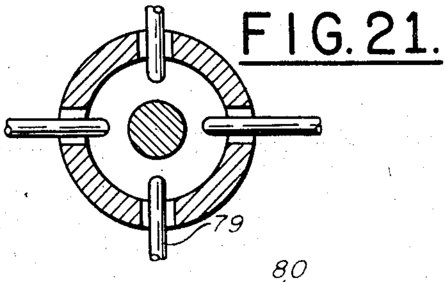
FIGS. 21 through 25 illustrate means for coupling base band pulses relative to the transmission line system of FIGS. 18 or 20.
Figure 22:
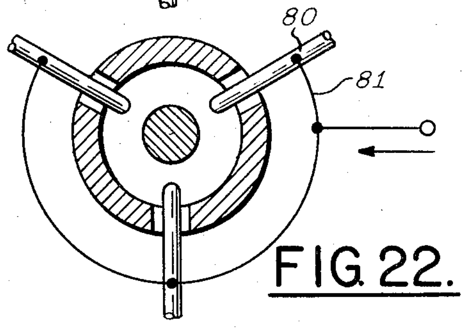
Figure 20:
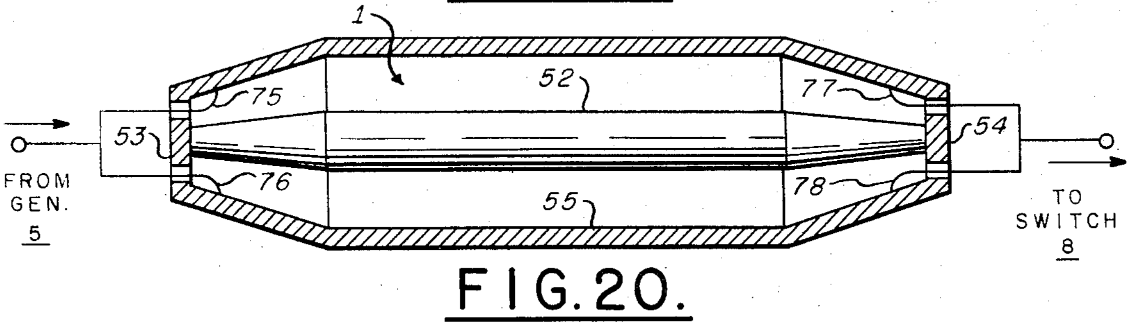
FIG. 20 discloses an alternative form of the transmission line system of FIG. 18.

Undesired dispersive high order modes are avoided by constructing the transmission line storage device 1 as symmetrically as possible. For example, FIGS. 20, 21, and 22 represent such symmetric constructions for a lineal coaxial line TEM-mode storage device. In FIG. 20, symmetry of input coupling is achieved by the use of the oppositely disposed magnetic input coupling loop transducers 75 and 76 fed symmetrically from generator 5 and the oppositely disposed transducers 77 and 78 for symmetric connection to switvh 8. In general, a plurality of such symmetrically disposed loops may be symmetrically fed. FIG. 21 represents the case of four such co-phasally fed symmetrically located loops, including loop 79. FIG. 22 shows three such loops, though it is understood that all loops will preferably be fed by a symmetric feed array 81. Other known types of couplers may similarly be employed in lieu of the loop couplers, including conventional couplers known as Bethe couplers.

The symmetric dual-feed, dual-output arrangement of FIG. 20 further avoids the high order mode problem by symmetrically tapering the dimensions of the inner and outer conductors 52, 55 toward the shorted ends 53, 54 of the storage device. The dimensions of conductors 52, 55 are cooperatively tapered in such a manner that the impedance of the line is maintained substantially constant between end walls 53, 54, Tapering of the line adjacent the input and output transducers causes higher order modes that would otherwise be generated by the perturbations attributed to loops 75 to 78 to be damped out before they reach the central large diameter section of storage device 1. While these tapers reduce the quality factor Q of the transmission line system somewhat, they are additionally beneficial because they aid in achieving the correct transducer coupling for matching the transducers to the impedance of the input and output circuits.

For example, input transducer 2 should match the driving source impedance of pulser 5 to storage device 1. The quality factor Q of the circuit comprising pulser 5 should therfore substantially match the interval quality factor Q of storage transmission line system 1 at all of the harmonic frequencies of the base band pulse so as to maintain the peak voltage of the pulse or pulses circulating in storage 1 maximum for a given amount of driving power supplied by pulse generator 5. In the preferred arrangement, the quality factor Q of storage 1 will be very high and the coupling supplied by input transducer 2 will therefore be light, the input coupling feed line being a TEM-mode transmission line, short in comparison to the longitudinal dimension of storage device 1.

Figure 23:
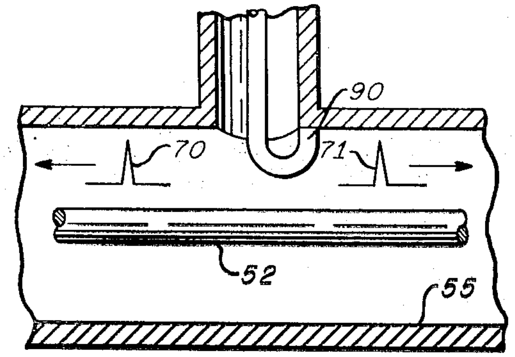
Figure 24:
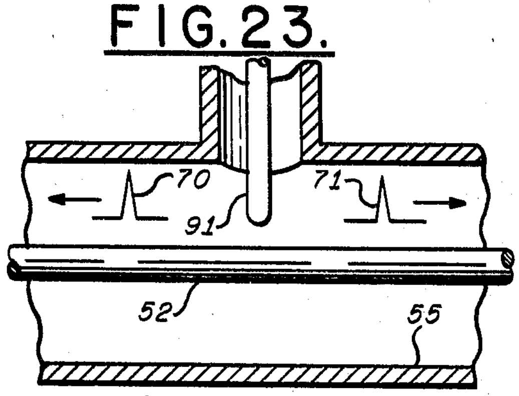
Figures 25, 27, 32:
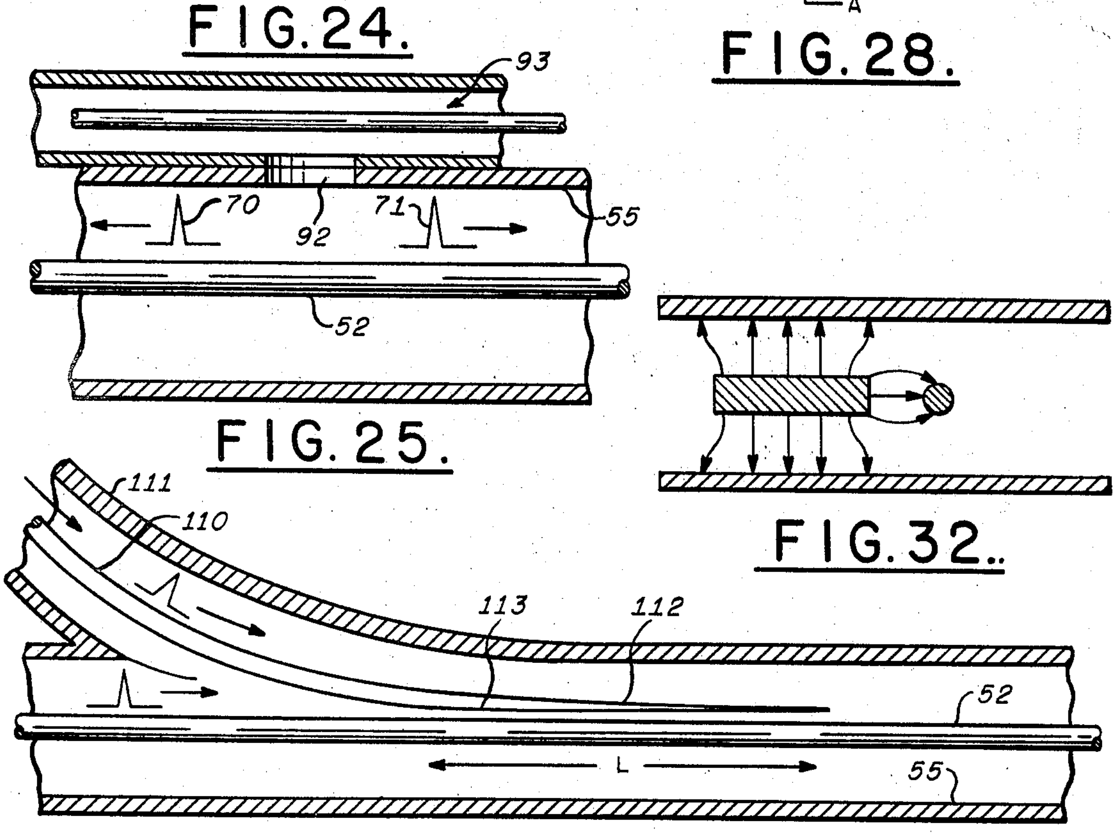
FIGS. 31 and 32 illustrate a preferred embodiment of the circuit of FIGS. 29 and 30.

Suitable light magnetic couplings for use at one end of device 1 have already been discussed, but other input couplings may be used with the device of FIG. 20, as in FIGS. 23, 24, and 25. FIG. 23 represents a magnetic coupling which may be employed at the mid-point of cavity 1 of FIG. 20 to generate the oppositely traveling pulses 70 and 71; a simple magnetic loop 90 is employed whose plane is at right angles to the common axis of conductors 52, 55.

Alternatively, the electric field probe 91 of FIG. 24 may be similarly situated with respect to coaxial conductors 52, 55 for producing the circulating pulses 70, 71. As in FIG. 25, a mixed electric and magnetic coupling may be provided by orienting a coaxial feed line 93 parallel to the conductors 52, 55 of storage device 1 with a common coupling aperture 92 therebetween. It will be apparent that the coupler configurations of FIGS. 23 through 25 may readily be converted into symmetric multiple coupler arrangements, such as those described in FIGS. 20, 21, and 22. It will further be apparent that such coupling systems are adapted to feeding one end of a lineal half wave transmission line storage device 1 with regular pulses of unipolar positive or negative types, such as shown in wave train 60 of FIG. 19. With bidirectional couplers, there are always equal and oppositely directed circulating pulses in storage device 1. In a shorted half wave storage device, excitation applied either at the shorted ends or at the mid-point of the storage device 1 will produce two circulating pulses per cycle, for example, when positive magnetic pulse excitation is used.

Figure 26:
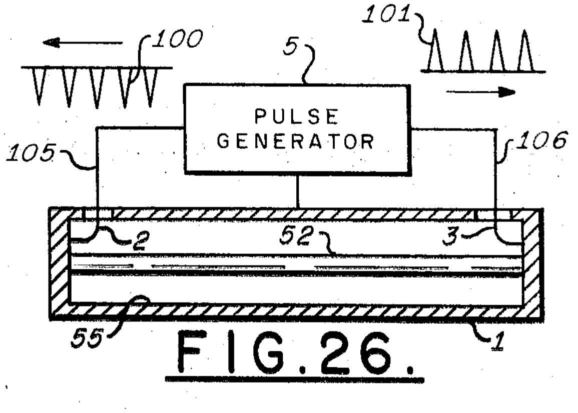
FIG. 26 presents an alternative form of the systems of FIGS. 1 and 18.

Pulse generators for producing trains of alternating positive and negative pulses are well known in the art, and these may be used beneficially to excite circulating pulses in a storage device, as in FIG. 26. In FIG. 26, the negative wave train 100 is fed at one end of storage device 1 via transducer 2 and at the opposite end via transducer 3, the alternately phased positive pulse train 101 is fed. Thus, oppositely running positive and negative pulses may be found at any predetermined location in storage device 1. The coaxial feed lines for transducers 2 and 3, represented in FIG. 26 by the respective single wires 105 and 106, should be of equal length. Alternatively, the total plus-minus pulse train may be fed into storage device 1 by placing it only on transducer 2 or on transducer 3.

While the coupling of the transducers does not have to be directional, the novel ramp directional coupler of FIG. 27 may be employed, since it is essentially a three-terminal device, whereas known four-terminal directional couplers may be wasteful of power. In FIG. 27, the coaxial transmission line storage device formed of conductors 52 and 55 is excited by a coaxial line 110, 111 whose conductors are smoothly joined to form a feed junction with the respective conductors 52, 55. The minor discontinuity effects at the junction are reduced by tapering the cross-section of inner feed conductor 110 over a distance L long compared to the wave length for the period T. The surface 113 of conductor 110 in the vicinity of the taper 112 may be generally conformal with the periphery of conductor 52 and may be separated therefrom by a thin sheet of low-loss dielectric material (not shown), if desired. Such a coupler may be employed, for example, to drive a storage device from the vicinity of one of its ends.

Before discussing preferred forms that the output coupler and switch configuration may take, some general observations may be considered. The output transducer 3 should present to storage device 1 substantially no loading when the switch 8 of FIGS. 1 or 18 disconnects storage device 1 from terminal 11. It will preferably dump the energy stored in the giant pulse completely into the load 9 at terminal 11 as the giant pulse arrives while switch 8 is conducting, and will perform the discharge in a small fraction of the fundamental period T. This is accomplished when the impedance of the load 9 is matched to that of storage device 1 at all of the harmonic frequencies of the giant pulse. Accordingly, in contrast with the character of input transducer 2, the output transducer 3 should be heavily coupled to storage device 1.

Figure 28:
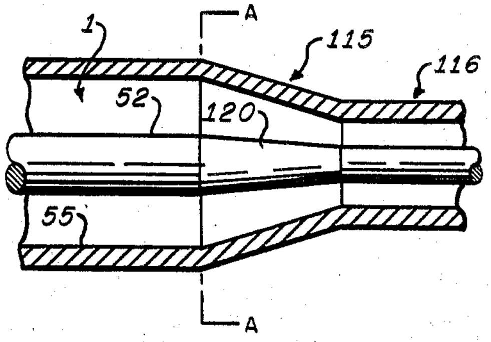
FIGS. 27 and 28 illustrate additional base band coupling arrangements.

Connection with the conductors 52, 55 of storage device 1 can also be made as in FIG. 28 through a tapered section 115 to the utilization line 116. The switch 8 may be located as a shunt switch in the plane A—A of the output device or as a series switch within conductor 52 at 120. As will be seen, it is preferred to position the switch 8 at location 120. Such a series switch 8 may be used at the mid-point of the storage cavity 1 or at an open end of a lineal transmission line with at least one open circuited end.

Figures 29, 30, 31:
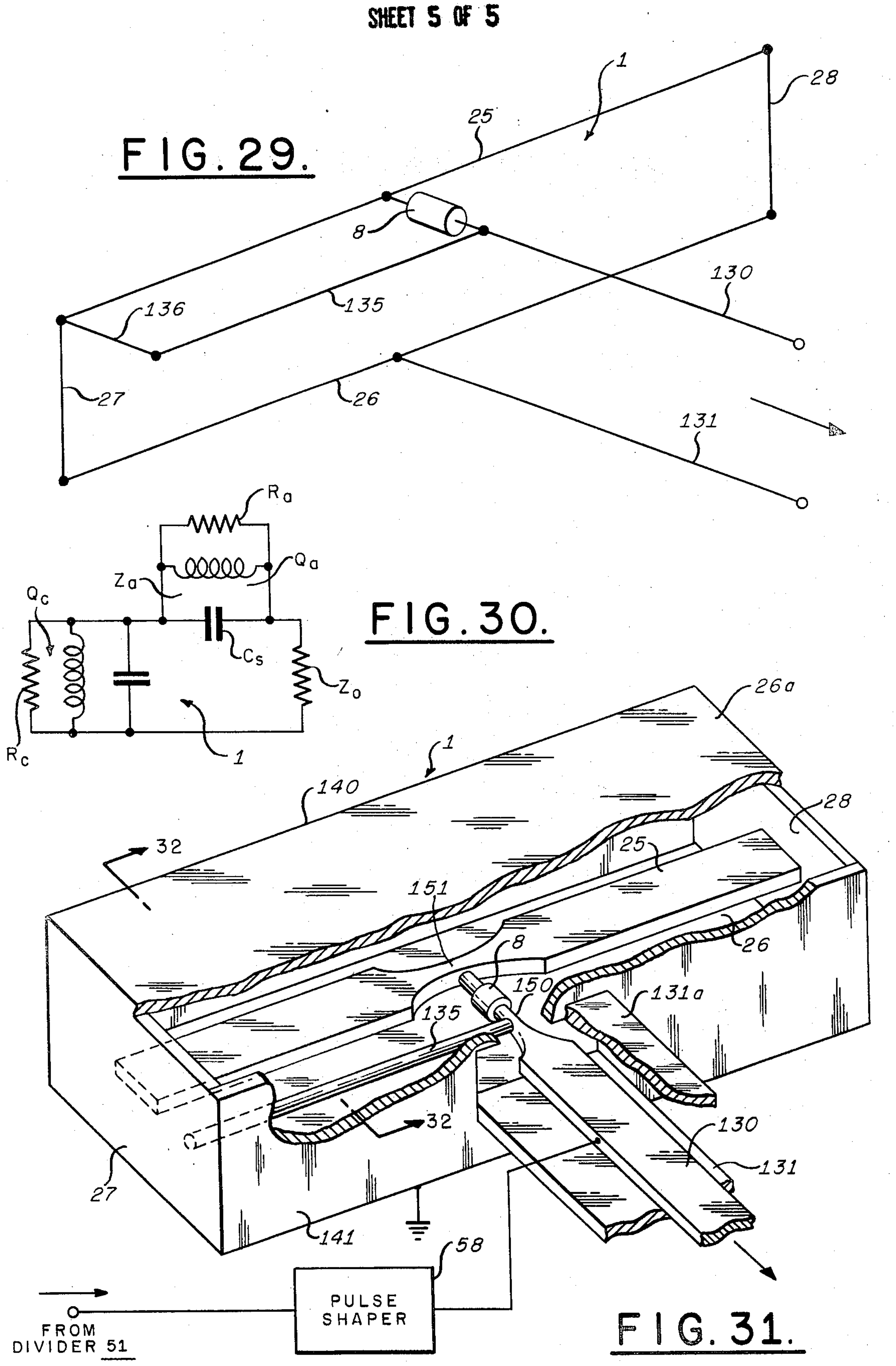
FIG. 29 is a schematic representation of an alternative form of the apparatus of FIGS. 1, 18, and 20.
FIG. 30 illustrates a lumped-constant equivalent at one frequency of the circuit of FIG. 29.

A preferred form of the output transducer and switch system for a storage device with both ends shorted is illustrated in schematic form in FIG. 29. The transmission line storage device 1 of FIG. 29, like the shorted two-wire device schematically represented in FIG. 3, utilizes parallel conductors 25, 26 with shorting conductors 27, 28 at their respective ends. A two-wire output transmission line 130, 131 is coupled at the mid-point of line 25, 26. It is assumed that at least one of the input transducers previously described is used to set up running base band pulses within the storage system. The output switch 8 is placed in series conductor 130, which latter may, of course, represent the inner conductor of a coaxial line, while conductor 131 represents the outer conductor thereof.

Because of its rapid turn on and turn off characteristics, it is preferred to use a known p-i-n switching diode as switch 8. In such switching diodes, there is generally a small capacity remaining when the switch is in the open or reverse-biased state, a capacity of magnitude about one picofarad. Such a capacitance is not negligible at the preferred impedance level of the transmission line system. In a continuous wave, single-frequency device, the effect of the small capacitance could be removed by resonating it with an inductance. However, in the case of the base band signals being dealt with in the invention, there is present a large array of harmonically related frequencies and the use of resonance at one particular frequency is not particularly helpful.

In the schematic drawing of FIG. 29, the desired result is produced by novel auxiliary circuit means. With the high quality factor Q pulse-storage TEM-mode line 25, 26 having a characteristic impedance $2Z_o$ and output line 130, 131 a characteristic impedance $Z_o$, the series switch 8 is connected in lead 130 very close to the mid-point of storage conductor 25, the length of line 25, 26 corresponding to T/2.

FIG. 30 is an equivalent circuit which may be used to represent the transmission line circuit of FIG. 29 for any one particular frequency component of the base-band pulse. For each such frequency or mode, there is a storage line shunt resistance $R_c$ and a corresponding quality factor $Q_c$ such that:

$$2R_c = Q_c \cdot 2Z_o$$

or $$R_c = Q_c\, Z_o$$

In order to resonate all harmonic components, an auxiliary transmission line 135 having a characteristic impedance $Z_a$ is added to the structure of FIG. 29, being shorted adjacent short 27 by short 136, and being coupled to storage transmission line 130 very close to switching diode 8. Auxiliary line 135 has a characteristic impedance $Z_a$, a quality factor $Q_a$, and a corresponding shunt resistance:

$R_a = Q_a Za$ for each resonating harmonic mode. The auxiliary line 135 and the storage transmission line 25, 26 are both shorted at one end of the system, so that the auxiliary line 135 has substantially identical resonating harmonics as the storage line 25, 26.

It is desired to have the highest possible value for the shunt resistance $R_a$ of the auxiliary line 135. The resultant or effective quality factor $Q$ of the storage transmission line 25, 26 is spoiled by the presence of the auxiliary line 135, so that:

$Q/Q_c = 1/1 + (R_c/R_a)$ $= 1/1 + (Q_c Z_0/Q_a Z_a)$

Thus, to reduce loading of the composite system, it is necessary to make $R_a$ as large as possible in comparison to that of the storage transmission line 25, 26. Accordingly, the auxiliary line 135 should have as high as possible a characteristic impedance $Z_a$ as is consistent with the required high value of its quality factor $Q_a$. Furthermore, the auxiliary line 135 should not be coupled tightly to the storage transmission line 25, 26; such may be arranged by orienting the respective TEM-mode lines so that the electric fields are substantially orthogonal.

FIGS. 31 and 32 represent a preferred form of the device shown schematically in FIGS. 29 and 30. It is seen that the storage transmission line of the storage device 1 is made up of a center conductor 25 and a pair of parallel plates 26, 26a. Conductive end pieces 27, 28 are located at the respective ends of line 25, 26, 26a and act as electrical slots and also as the means for supporting the parallel conductors 25, 26, 26a with respect to each other. The side plates 140, 141 may also be conductive; on the other hand, if a true parallel plate transmission line construction is desired, side plates 140, 141 may be formed of a low loss dielectric designed to protect the interior of the pulse storage device from corrosion and dirt. It will also be understood that other types of TEM-mode non-dispersive transmission lines, such as coaxial line, may be used. In the latter case, the plates 26, 26a, 140, 141 will be replaced by a single circular conducting tube enclosing conductor 130.

The auxiliary line 135 is seen connected at junction 150 between the inner surface of shorting plate 27 and the output line 130 adjacent switch 8. Switch 8 is connected between junction 130 and the tapered mid-point 151 of the storage line inner conductor 25. The generally symmetric taper at mid-point 151 effects improved impedance match between line 25 and switch 8. The shape of line 25 and its location between conductive plates 26, 26a may be adjusted in the conventional manner so that the storage line 1 has uniform characteristic impedance. Auxiliary line 135 may vary in diameter and in displacement from storage line 25 for the same general purpose. Preferably, the conductor 135 of the auxiliary line should be in the plane of symmetry of the parallel plates 26, 26a, so that electric field lines are substantially orthogonal and symmetrically balanced as seen in FIG. 32.

The output transmission line 130, 131 of FIG. 29 finds its counterpart in FIG. 31 in the conductor 130 stemming from junction 150. The output system may take the form of a parallel plate transmission line comprising conductors 130, 131, 131a. Alternatively, line 130 may take the form of a center conductor of a coaxial line whose hollow tubular outer conductor takes the place of parallel plates 131, 131a. Other TEM-mode transmission lines and other combinations of them may readily be envisioned.

In operation, regular base band pulse trains are injected as previously described by compatible input transducers that are not shown in FIG. 31 simply to reduce the complexity of the drawing. It will be clear to those skilled in the art that suitable input transducers may be selected from those described in connection with FIGS. 18 and 20 through 28. The traveling pulses excited within the storage device 1 are reflected back and forth with inversions at shorts 27, 28 and grow in amplitude as energy is added to them from pulser 5. Upon the arrival of the $n$'th pulse at an output, pulse shaper 58 under control of divider 51 produces a gating pulse. The latter is coupled across switch 8 to cause it to conduct the giant pulse out of storage device 1 along output transmission line 130, 131, 131a to load 9.

It will be understood by those skilled in the art that the dimensions and proportions selected for use in FIG. 31, and in the preceding figures as well, have generally been selected in order to foster clarity in the drawings. Accordingly, such dimensions and proportions are not necessarily those which would be used in actual construction of the invention.

It is seen that the invention provides an efficient and versatile means for enhancing the peak power of pulses originating in a low peak power short pulse generator. The invention provides means for combining in time and in space the energy of regular low-level pulse trains, combining the energy to obtain pulses of peak power many times the magnitude of the individual pulses generated by conventional base-band pulse generators. The peak power enhancement process trades upon the high repetition rate of the conventional pulse generator to derive the enhanced peak power of the giant output pulse.

The invention is a useful adjunct in base-band signal processing, providing delay and filtering and maintaining shaping of recirculating time-limited signals. If the external feed back amplifier 6 of FIG. 1 is used, stored signals can be maintained for substantial periods of time. The stored signal may then be abstracted at an ordinary later time for use as in correlation processes.

In all applications, the invention provides separation of the functions of pulse generation and of switching. The output pulse rise time is independently optimized by utilizing the best available mode of base-band pulse generation and selection and release of the giant output pulse is a separated optimized operation.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. The combination comprising:

transmission line energy storage means adapted for substantially dispersionless propagation therein of TEM-mode electromagnetic waves, wave reflecting means coupled in spaced relation at ends of said transmission line energy storage means for permitting said electromagnetic waves to make multiple transits between said wave reflecting means, each said transit having a characteristic transit time, source means for coupling a train of base band electro magnetic pulses into said transmission line energy storage means, said pulse train having a characteristic pulse repetition interval, and output circuit means including switch means coupled to said transmission line energy storage means, said characteristic transit time and said characteristic pulse repetition interval being synchronized so that successive ones of said base band pulses of said pulse train arrive at said output circuit means for forming a substantially amplified base band pulse, said switch means being responsive to said source means for transferring said switch to its conductive state only prior to the arrival of said substantially amplified base band pulse at said switch means and for transferring said switch means to its non-conductive state only after the passage of said substantially amplified base band pulse through said switch means.

2. Apparatus as described in claim 1 wherein said wave reflecting means comprises transmission line short circuiting means placed at spaced apart ends thereof.

3. Apparatus as described in claim 1 wherein said switch means is responsive to means in series circuit with said source means comprising:

variable delay means, pulse frequency divider means, and pulse shaper means.

4. Apparatus as described in claim 1 wherein:

said transmission line energy storage means comprises coaxial transmission line means, said coaxial line means having short circuiting means at its ends, said coaxial line means having energy coupling means at said short circuiting means, and said coaxial line means including a constant impedance geometrically-tapered section at each end thereof adjacent said short circuiting means.

5. Apparatus as described in claim 1 wherein:

said source means is coupled at the mid-point of said transmission line energy storage means for propagating base band pulses in both directions therein.

6. Apparatus as described in claim 1 wherein said source means comprises:

base band pulse generator means for generating on a first output a positive train of base band pulses and on a second output a negative train of base band pulses, means for coupling said positive pulse train at a first short circuited end of said transmission line energy storage means, and means for coupling said negative pulse train at a second short circuited end of said transmission line energy storage means.

7. Apparatus as described in claim 1 wherein said wave reflecting means comprises transmission line short circuiting means placed at least at one end thereof.

8. Apparatus as described in claim 7 wherein said output circuit means is coupled to said transmission line energy storage means at a shorted end thereof.

9. Apparatus as described in claim 7 wherein said source means is coupled to said transmission line energy storage means at a shorted end therof.

10. Apparatus as described in claim 9 wherein said source means includes base band pulse train generator means.

11. Apparatus as described in claim 1 wherein:

said transmission line energy storage means comprises at least first and second conductor means each having first and second ends, said wave reflecting means comprises electrically shorting means for connecting said respective first ends and for connecting said respective second ends, and said output circuit means comprises transmission line means having third and fourth conductor means respectively coupled to said first and second conductor means at the mid-point of said transmission line energy storage means.

12. Apparatus as described in claim 11 wherein:

said switch means is coupled in series relation in said third conductor means at said first conductor means.

13. Apparatus as described in claim 12 wherein:

said switch means comprises p-i-n diode means responsive to said source means.

14. Apparatus as described in claim 12 additionally including:

compensating transmission line means comprising conductor means coupling one of said wave reflecting means to the side of said switch means opposite said first conductor means.

* * * * *